(12) United States Patent
Corcoran

(10) Patent No.: US 11,050,321 B2
(45) Date of Patent: Jun. 29, 2021

(54) MOTOR CONDUIT PLUG

(71) Applicant: Nidec Motor Corporation, St. Louis, MO (US)

(72) Inventor: Marc J. Corcoran, St. Charles, MO (US)

(73) Assignee: Nidec Motor Corporation, St. Louis, MO (US)

( * ) Notice: Subject to any disclaimer, the term of this patent is extended or adjusted under 35 U.S.C. 154(b) by 126 days.

(21) Appl. No.: 16/571,452

(22) Filed: Sep. 16, 2019

(65) Prior Publication Data

US 2020/0091796 A1  Mar. 19, 2020

Related U.S. Application Data

(60) Provisional application No. 62/732,597, filed on Sep. 18, 2018.

(51) Int. Cl.
*H02K 11/00* (2016.01)
*H02K 5/22* (2006.01)

(52) U.S. Cl.
CPC .................... *H02K 5/225* (2013.01)

(58) Field of Classification Search
CPC .................................................... H02K 5/225
See application file for complete search history.

(56) References Cited

U.S. PATENT DOCUMENTS

| | | | |
|---|---|---|---|
| 4,474,489 A * | 10/1984 | Simon | H02G 15/007 403/195 |
| 5,346,264 A * | 9/1994 | Law | F16L 25/0045 285/136.1 |
| 5,872,335 A | 2/1999 | Mullen, Jr. | |
| 5,888,105 A | 3/1999 | Brown et al. | |
| 6,173,998 B1 | 1/2001 | Bock | |
| 6,186,821 B1 | 2/2001 | Mullen, Jr. | |
| 6,190,212 B1 | 2/2001 | Brown et al. | |
| 6,196,885 B1 | 3/2001 | Catalino, Jr. et al. | |
| 6,290,512 B1 | 9/2001 | Mullen, Jr. | |
| 6,300,569 B1 | 10/2001 | Mullen, Jr. | |
| 6,328,594 B1 | 12/2001 | Mullen, Jr. | |
| 6,460,638 B1 * | 10/2002 | Strunsee | H02G 3/083 16/2.2 |
| 6,488,540 B2 | 12/2002 | Coyle, Jr. et al. | |

(Continued)

FOREIGN PATENT DOCUMENTS

WO          9427079          11/1994

OTHER PUBLICATIONS

Downloaded Product Datasheet for Heyco—Tite Snap-In-2 Liquid Tight Corgrips (downloaded Aug. 2018).

(Continued)

*Primary Examiner* — Yuriy Semenenko
(74) *Attorney, Agent, or Firm* — Hovey Williams LLP

(57) ABSTRACT

A conduit plug for attachment to a motor case includes a base partly defining a central passage extending along a longitudinal axis of the plug. The base has a skirt extending radially with respect to the longitudinal axis and two circumferentially-spaced straight-edge segments. The plug further includes a ribbed tube cooperatively defining the central passage and extending from the skirt opposite the two straight-edge segments. Each of the two straight-edge segments includes a camming clip configured for resilient retraction toward the central passage.

20 Claims, 15 Drawing Sheets

(56) References Cited

U.S. PATENT DOCUMENTS

| | | | |
|---|---|---|---|
| 6,508,274 B2* | 1/2003 | Street | F16L 37/18 |
| | | | 138/89 |
| 6,585,297 B2* | 7/2003 | Mullen, Jr. | F16L 25/0036 |
| | | | 285/149.1 |
| 6,854,772 B2* | 2/2005 | Weller | F16L 37/133 |
| | | | 285/314 |
| 6,994,382 B2* | 2/2006 | Peterson | F16L 25/0045 |
| | | | 285/401 |
| 7,240,700 B2* | 7/2007 | Pangallo | B62D 25/24 |
| | | | 141/65 |
| 7,354,075 B2 | 4/2008 | Hagen | |
| 7,699,654 B2 | 4/2010 | Tanaka et al. | |
| 8,087,948 B2 | 1/2012 | Ambo et al. | |
| 8,398,419 B2 | 3/2013 | Coyle, Jr. | |
| 8,777,660 B2 | 7/2014 | Chiarelli et al. | |
| 9,039,424 B2 | 5/2015 | Camelio et al. | |
| 9,371,948 B2* | 6/2016 | Coyle, Jr. | F16L 5/06 |
| 9,616,218 B2 | 4/2017 | Jang | |
| 9,853,437 B2 | 12/2017 | Coyle | |
| 10,826,253 B2* | 11/2020 | Gretz | H01R 4/64 |
| 2002/0033601 A1* | 3/2002 | Mullen, Jr. | F16L 41/10 |
| | | | 285/149.1 |
| 2017/0125939 A1* | 5/2017 | Relue | H01R 13/622 |
| 2018/0358860 A1* | 12/2018 | Major | H01R 13/631 |

OTHER PUBLICATIONS

Printout of webpage for Heyco-Flex Quick Twist Conduit Fittings (printed Aug. 17, 2018).
Printout of webpage for Herz Snap-In Cordgrip Strain Reliefs—Straight-Thru (printed Aug. 17, 2018).

* cited by examiner

MOTOR CONDUIT PLUG

CROSS-REFERENCE TO RELATED APPLICATION

The present application claims the benefit of and priority from identically-titled U.S. Provisional Patent Application Ser. No. 62/732,597, filed Sep. 18, 2018, the entire disclosure of which is hereby incorporated by reference herein.

BACKGROUND OF THE INVENTION

Field of the Invention

The present invention relates to a plug for protecting motor cables. More particularly, the present invention relates to a plug with reduced tooling requirements for assembly to and improved sealing against a motor case.

Discussion of the Related Art

A conventional plug that serves as a conduit for motor cables passing through a motor case is carefully machined for attachment to the motor case using one or more tools. Such plugs leave little room for error, and deviation from unforgiving manufacturing tolerances often leads to failure at quality inspection or, worse, failure on implementation. These and other factors together lead to substantial expenditures of time and resources associated with sealing a conventional plug to a motor case.

SUMMARY

According to one aspect of the present invention, a conduit plug for attachment to a motor case is provided. The conduit plug includes a base partly defining a central passage extending along a longitudinal axis of the plug. The base has a skirt extending radially with respect to the longitudinal axis and two circumferentially-spaced straight-edge segments. The plug further includes a ribbed tube cooperatively defining the central passage and extending from the skirt opposite the two straight-edge segments. Each of the two straight-edge segments includes a camming clip configured for resilient retraction toward the central passage.

According to another aspect of the present invention, a motor assembly is provided. The motor assembly includes a motor case having a face and an edge adjacent the face that defines an opening. The motor assembly also includes a conduit plug inserted into the opening. The conduit plug includes a base extending along a longitudinal axis. The base has a camming clip and a skirt overlying the face. The skirt extends radially relative to the longitudinal axis. The conduit plug also includes a ribbed tube extending from the skirt opposite the camming clip. The face includes a face side portion. The skirt includes an underside that has a side portion positioned correspondingly to the face side portion. The skirt side portion forms an acute angle with the longitudinal axis, and the face side portion forms an acute angle with the longitudinal axis within five degrees (5°) of the angle formed by the skirt side portion.

According to yet another aspect of the present invention, another motor assembly is provided. The motor assembly includes a motor case having a face and an edge defining an opening adjacent the face. The edge includes two circumferentially-spaced straight edge portions. The motor assembly also includes a conduit plug. The conduit plug includes a base partly defining a central passage extending along a longitudinal axis. The base has a skirt extending radially with respect to the longitudinal axis. The base also has two straight-edge segments generally corresponding to the straight-edge portions of the edge. The conduit plug further includes a ribbed tube cooperatively defining the central passage and extending from the skirt opposite the two straight-edge segments. Each of the two straight-edge segments includes a camming clip configured for engagement with one of the two straight edge portions of the motor case and for resilient retraction toward the central passage.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with regard to the attached drawing figures, wherein.

Figure 1:
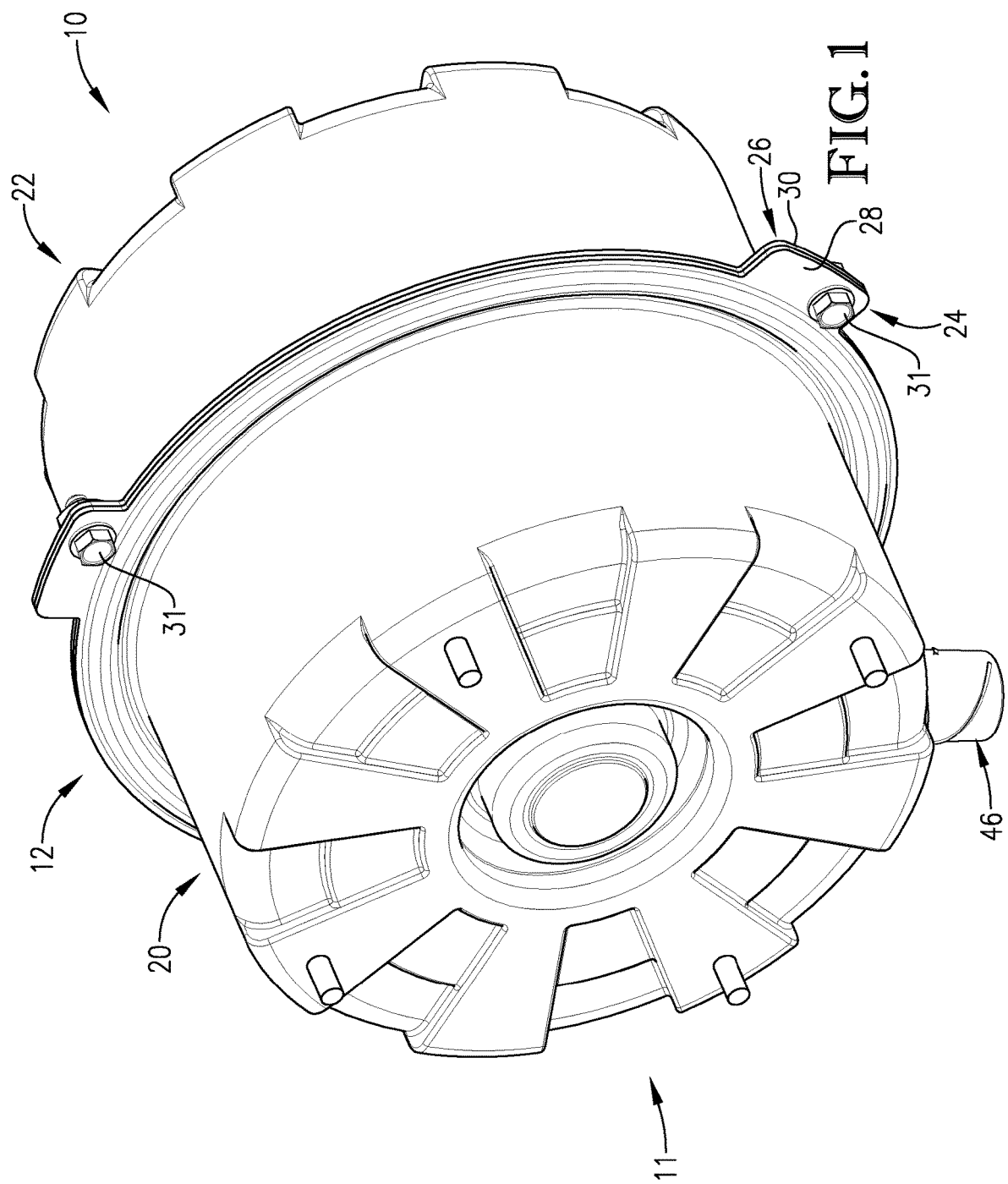
FIG. 1 is a rear perspective view of a clamshell-style motor with assembled conduit plug in accordance with a preferred embodiment of the present invention.
Figure 2:
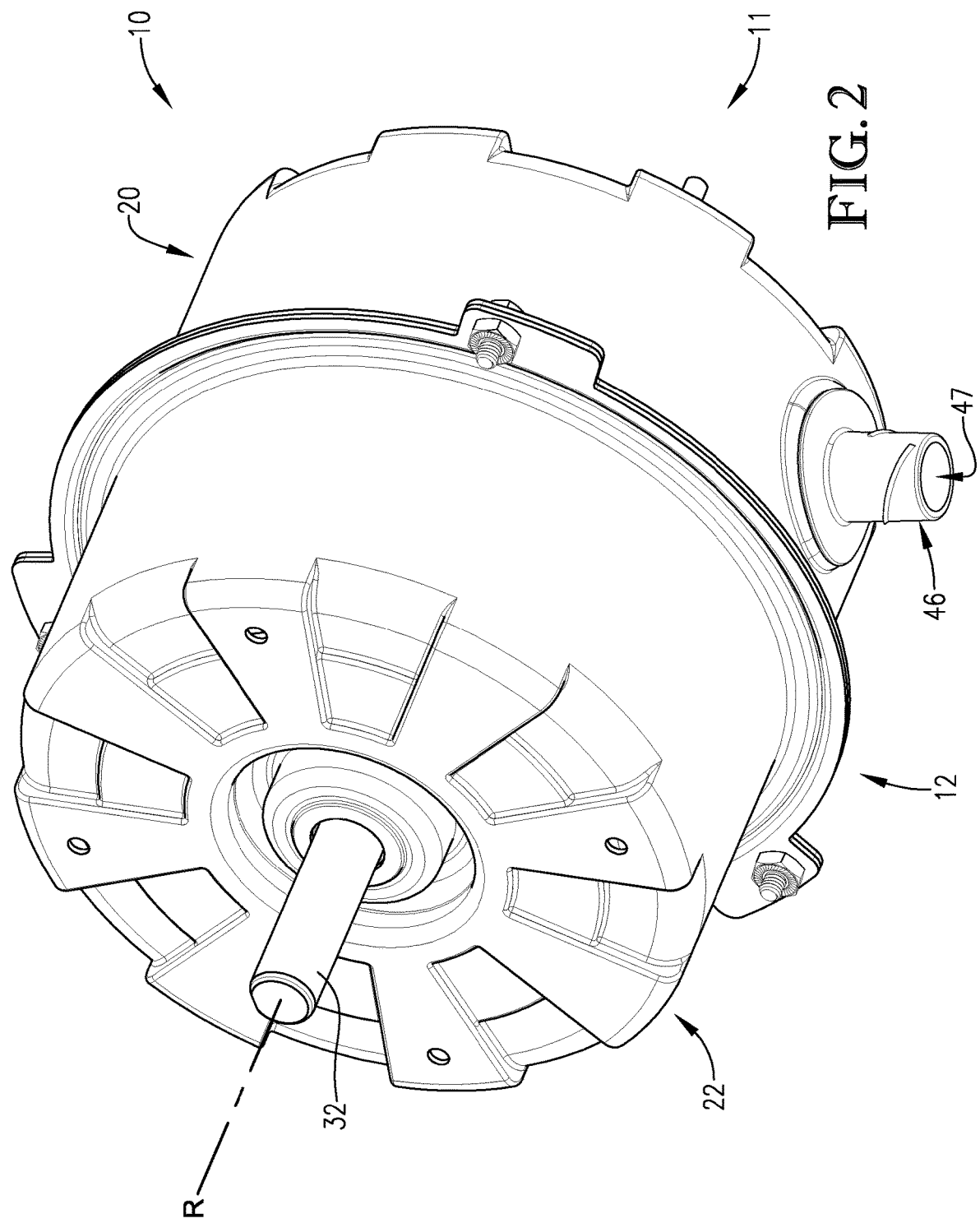
FIG. 2 is a front perspective view of the motor and conduit plug of FIG. 1.
Figure 3:
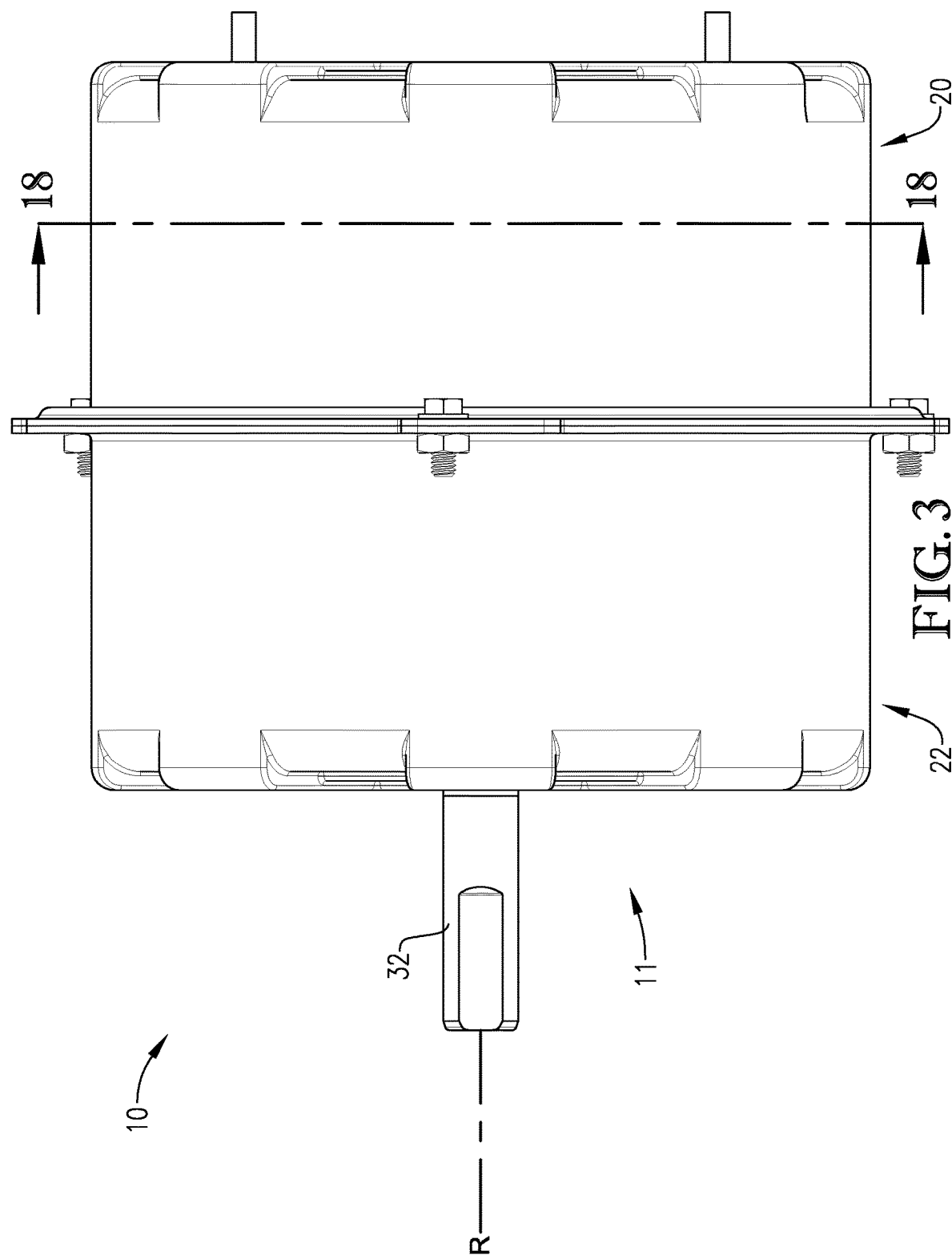
FIG. 3 is a side view of the motor and conduit plug of FIG. 1.
Figure 18:
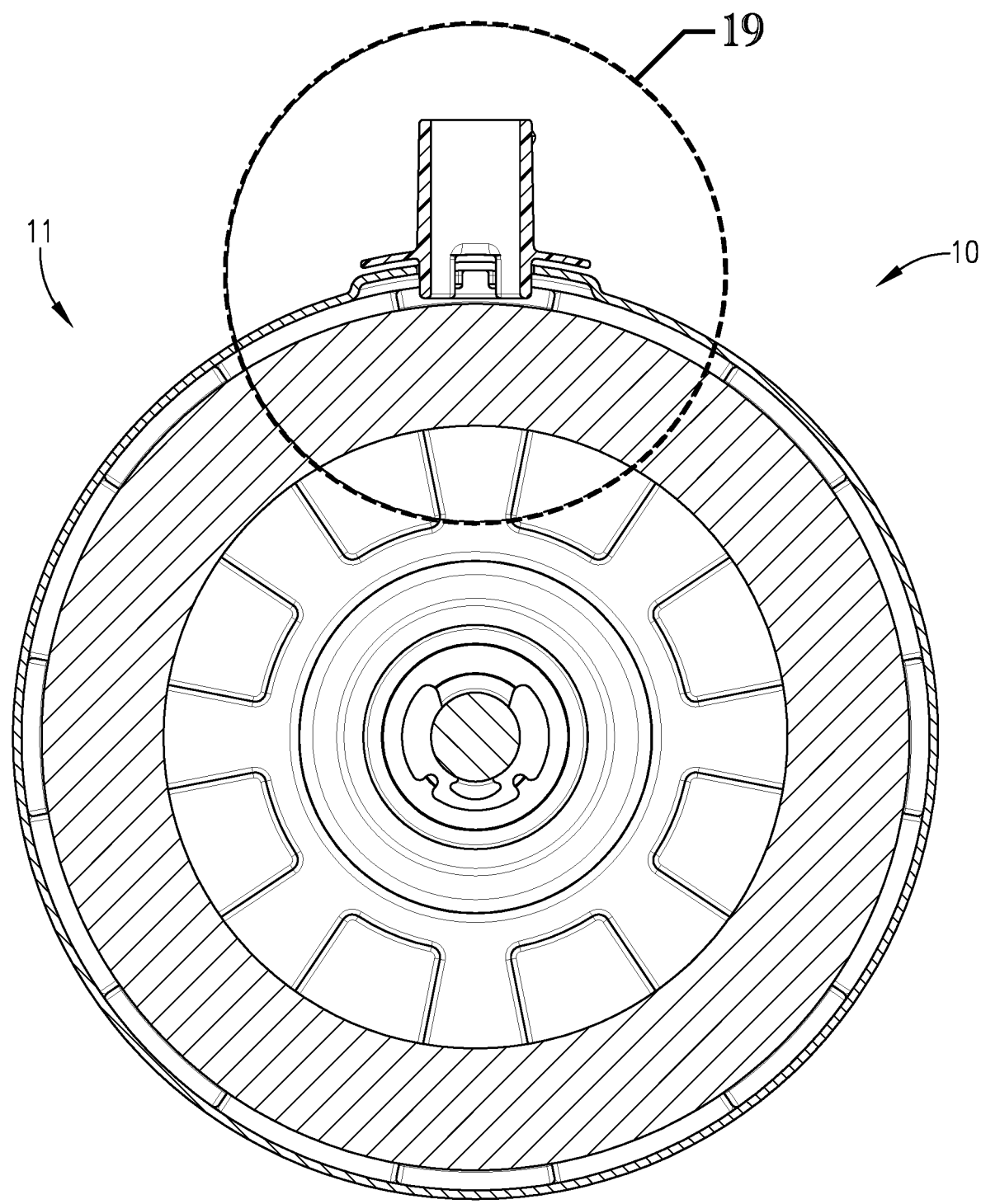
Figure 19:
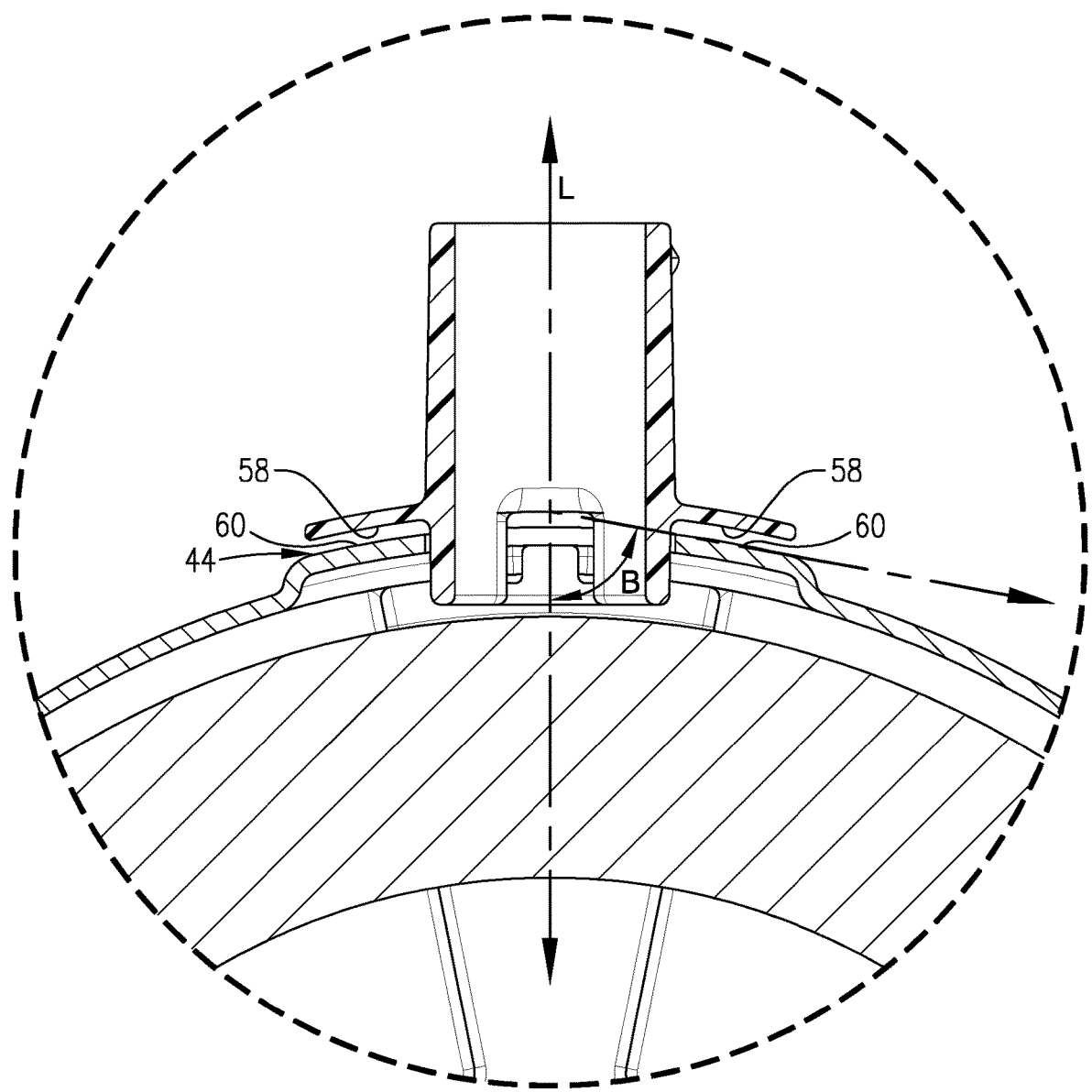

FIG. 18 is a cross-sectional front view of the motor and conduit plug of FIG. 1, taken along line 18-18 of FIG. 3 with the gasket removed to show details of the motor and conduit plug; and FIG. 19 is an enlarged cross-sectional front view of a portion of the motor and conduit plug of FIG. 18, particularly illustrating angles formed by a skirt of the conduit plug and by a face of the motor, in each case with respect to a longitudinal axis of the conduit plug.

The drawing figures do not limit the present invention to the specific embodiments disclosed and described herein. While the drawings do not necessarily provide exact dimensions or tolerances for the illustrated components or structures, the drawings are to scale with respect to the relationships between the components of the structures illustrated in the drawings.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Furthermore, unless specified or made clear, the directional references made herein with regard to the present invention and/or associated components (for example, top, bottom, upper, lower, inner, outer, etc.) are used solely for the sake of convenience and should be understood only in relation to each other. For instance, a component might in practice be oriented such that faces referred to as "top" and "bottom" are sideways, angled, inverted, etc. relative to the chosen frame of reference.

With initial reference to FIGS. 1-5, an electric motor assembly 10 includes a motor 11 having a clamshell-style motor case 12. The motor 11 also includes a rotor assembly 14 rotatable about an axis R, and a stator assembly 16. The rotor assembly 14 and the stator assembly 16 are both at least substantially contained within an internal motor chamber 18 that is defined by the motor case 12.

The motor case 12 comprises first and second halves 20, 22. The first and second halves 20, 22 respectively include flared axially inner ends 24, 26. The axially inner ends 24, 26 respectively include circumferential lips 28, 30 extending radially outward. The lips 28, 30 are joined together by circumferentially- and arcuately-spaced fasteners 31. The fasteners 31 may comprise bolts, screws, clamps or other fasteners without departing from the spirit of the present invention.

Figure 4:
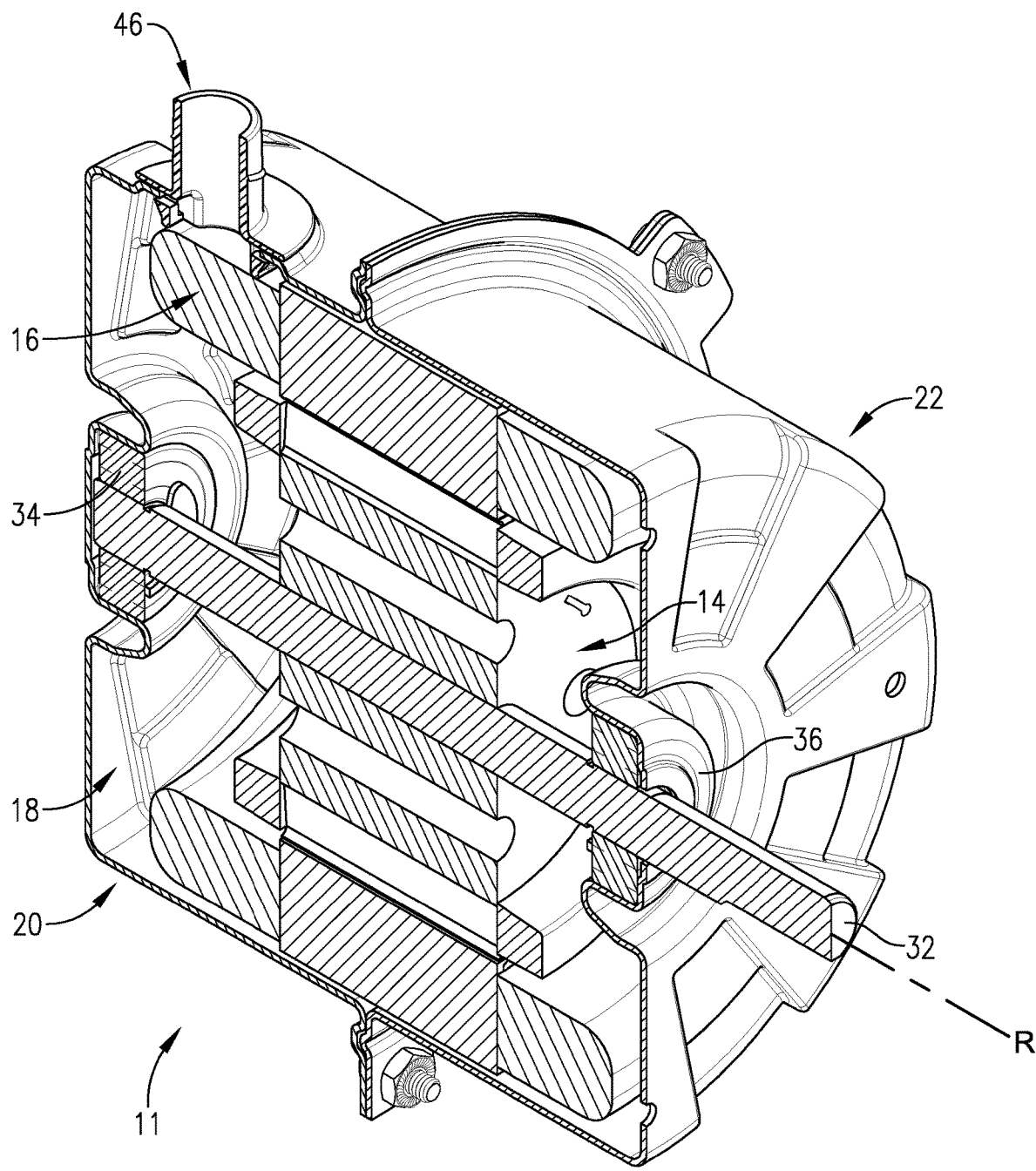
FIG. 4 is vertical cross section of the motor and conduit plug of FIG. 1, cut upon a center axis of a motor shaft of the motor and taken from a front perspective view.
Figure 5:
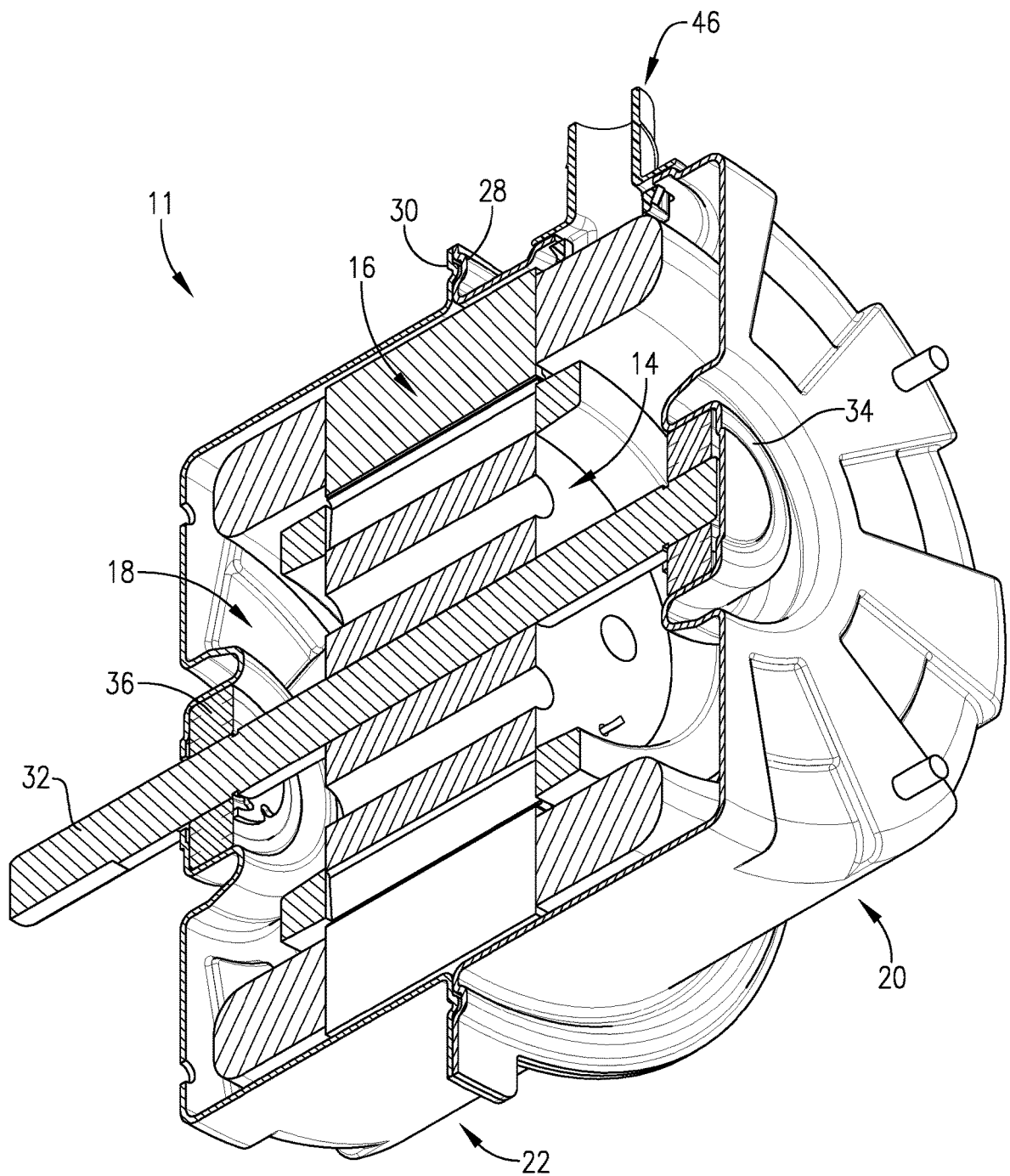
FIG. 5 is a rear perspective view of the vertical cross section of FIG. 4.
Figure 6:
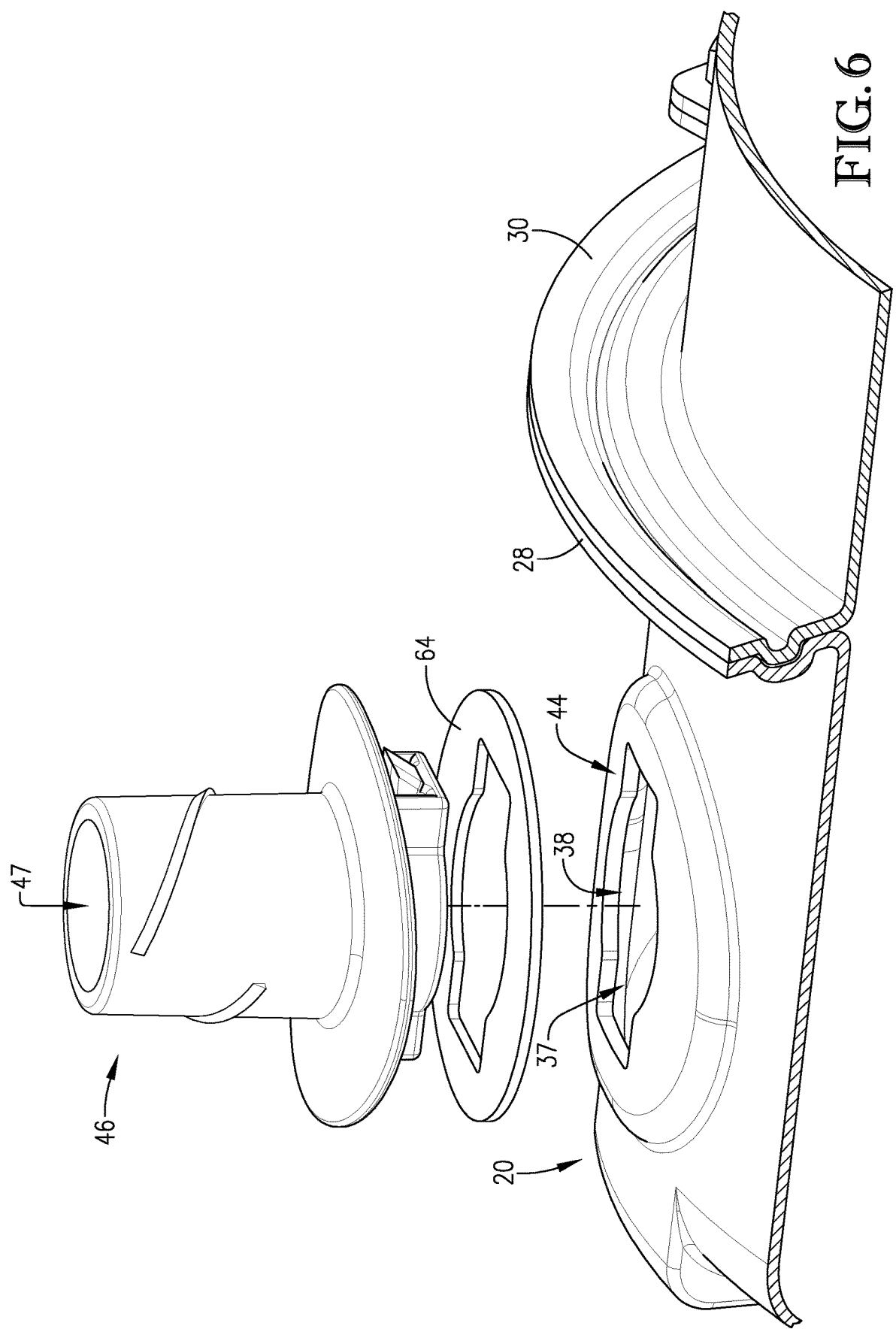
FIG. 6 is a partial exploded view of the motor and conduit plug of FIG. 1, illustrating removal of the conduit plug and a gasket from a face of the motor.

As shown in FIGS. 4-5, the rotor assembly 14 includes an axially disposed shaft 32 that projects outwardly from an axially outer end of the motor case 12 and is rotatably supported by bearing assemblies 34, 36.

Preferably, the motor case 12 forms a substantially complete enclosure for the internal motor chamber 18 such that ingress of contaminants therethrough is restricted or prevented. In a preferred embodiment, the motor case 12 comprises stamped steel. It is permissible according to some aspects of the present invention, however, for another suitable material or materials (for example, cast iron or aluminum) to be used.

Except with respect to the structure described and taught herein for and/or relating to providing a sealed interface permitting electrical communication with the motor assembly 10, the structure and operation of the motor assembly 10 is generally conventional in nature, as will be readily appreciated by one of ordinary skill in the art, and need not be described in further detail here. Furthermore, such conventional aspects of the motor design may be varied without departing from the scope of the present invention. For instance, a conduit motor plug according to aspects of the present invention may be assembled to motor cases or shells of other than a clamshell configuration.

Turning now to FIGS. 6-9, an electrical communication opening 37 of the motor assembly 10 is defined in the motor case 12. The opening 37 may provide a passage for electrical connection with a plurality of motor terminals (not shown) formed by the ends of respective phase winding wires. It is noted that the particular shape of the opening 37 depicted herein is provided by way of example only, and an opening could take alternative shapes without departing from the spirit of the present invention. Moreover, one of ordinary skill in the art will readily understand that an opening could alternatively be disposed elsewhere along a motor case within the scope of the present invention.

Figure 7:
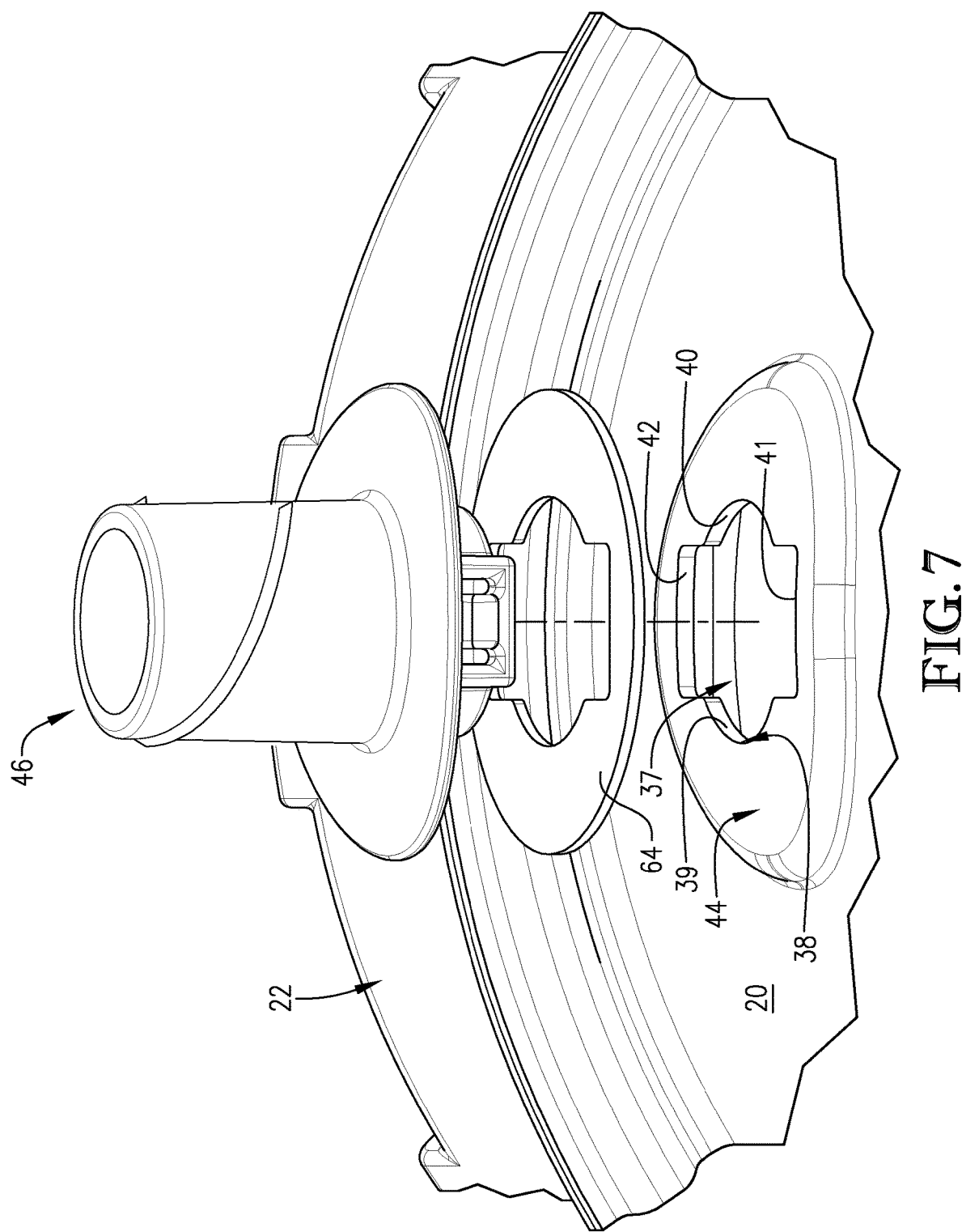
FIG. 7 is an alternative partial exploded view of the motor and conduit plug of FIG. 6, taken from a rear perspective.
Figure 8:
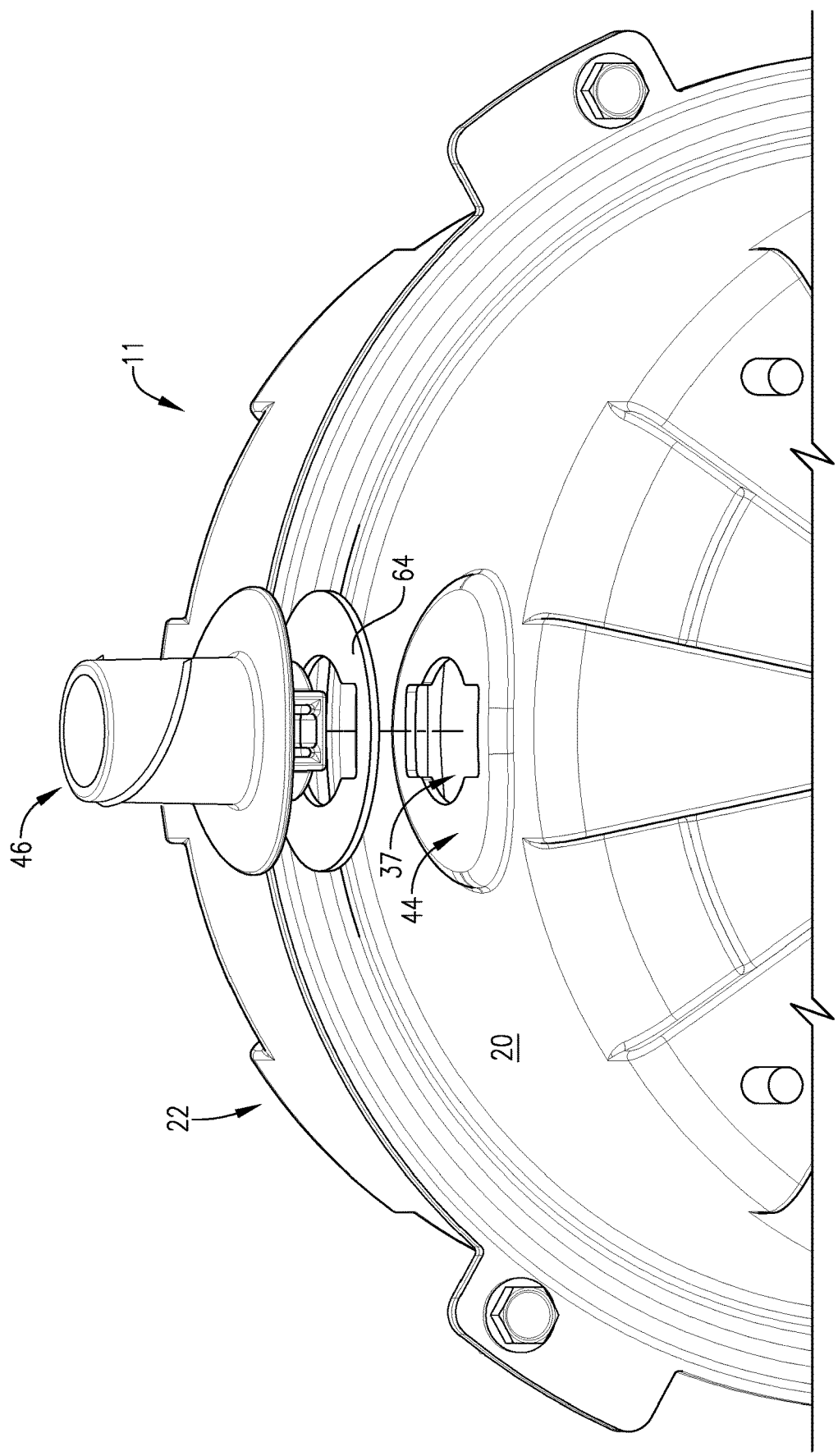
FIG. 8 is a fuller view of the partial exploded perspective of the motor and conduit plug of FIG. 7.

The opening 37 is defined by an edge 38 having opposed arcuate segments 39, 40 separated by or interposed between opposed straight-edge segments 41, 42 (see FIG. 7). In the illustrated embodiment, the straight-edge segments 41, 42 comprise a plurality of straight edges forming three-walled rectangles. However, as noted above, the shape of the edge 38 may vary without departing from the spirit of the present invention. Preferably, however, the shape of the edge 38 includes at least one straight-edge segment to restrict rotation, as discussed in more detail below. More preferably, an edge defining an electrical communication opening according to embodiments of the present invention has at least one straight-edge segment matched to a corresponding camming clip to reduce wear-and-tear, also as discussed in more detail below.

Figure 9:
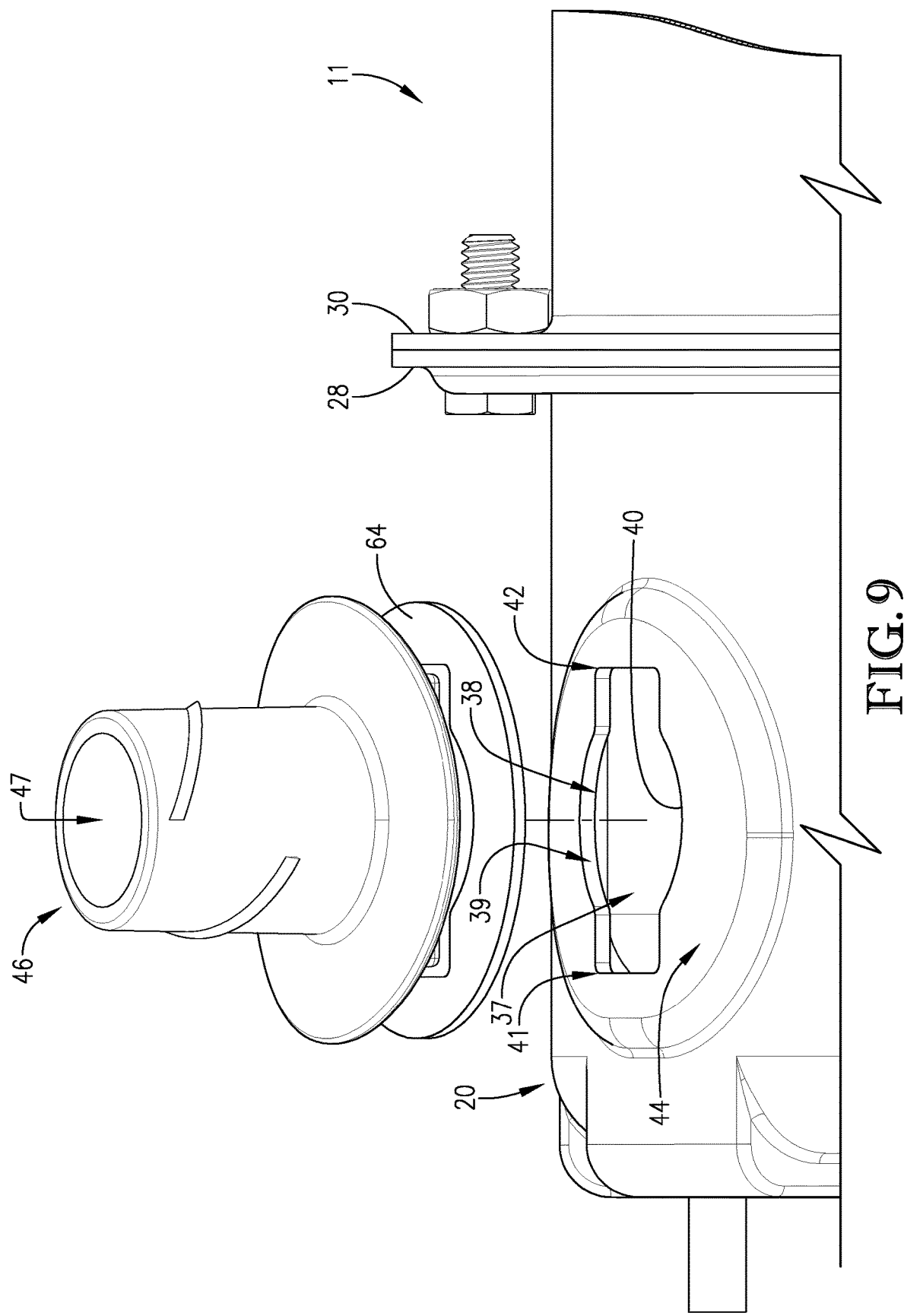
FIG. 9 is a partial exploded view of the motor and conduit plug of FIG. 1, taken from a rotated side perspective.
Figure 10:
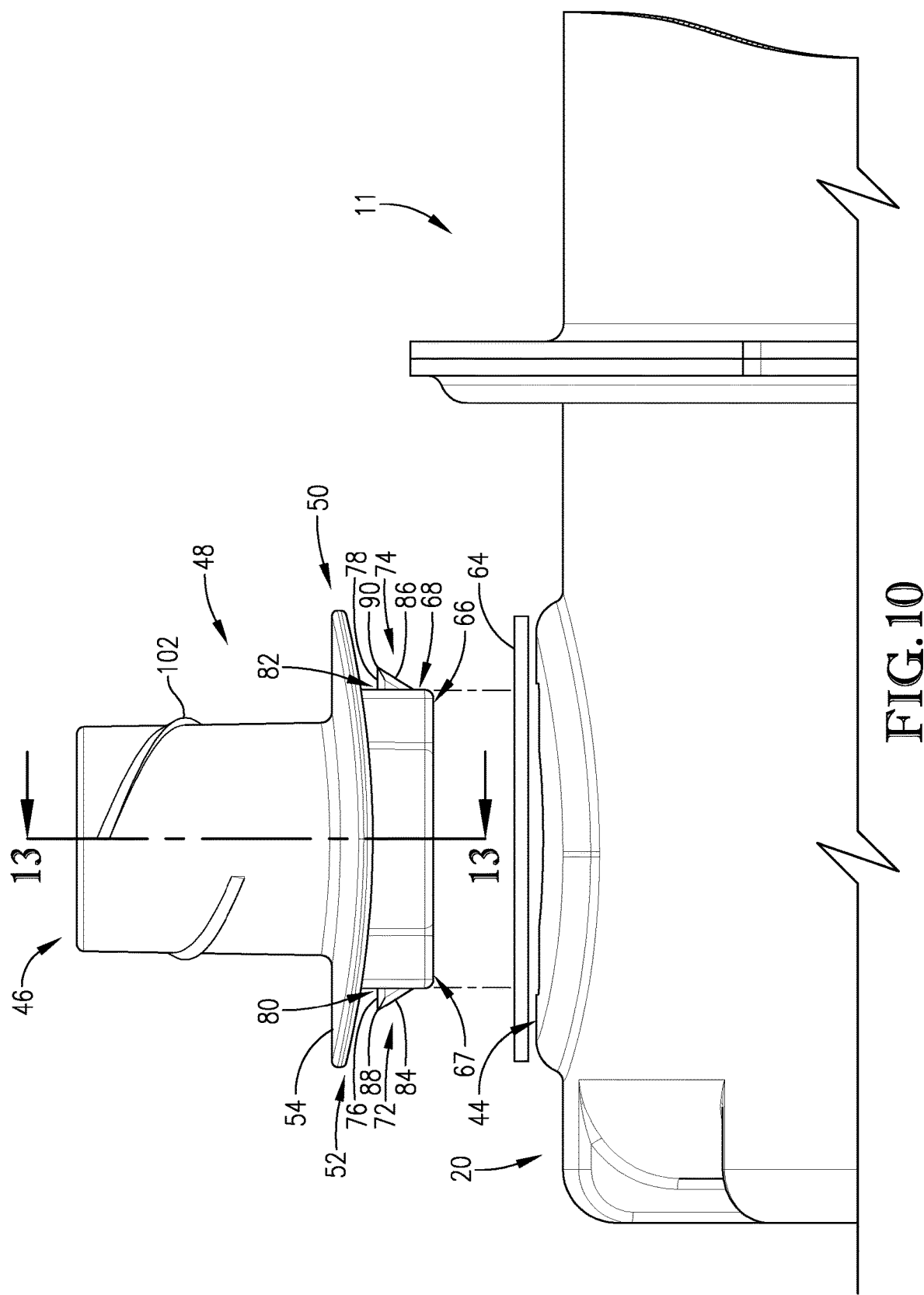
FIG. 10 is a partial exploded view of the motor and conduit plug of FIG. 1, taken from a side perspective.
Figure 11:
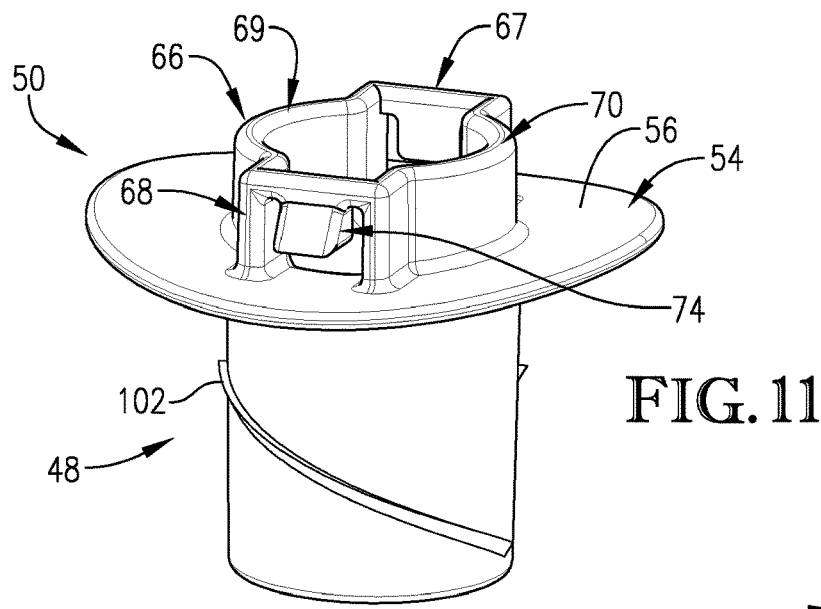
FIG. 11 is a perspective view of an underside of the conduit plug of FIG. 1.
Figure 12:
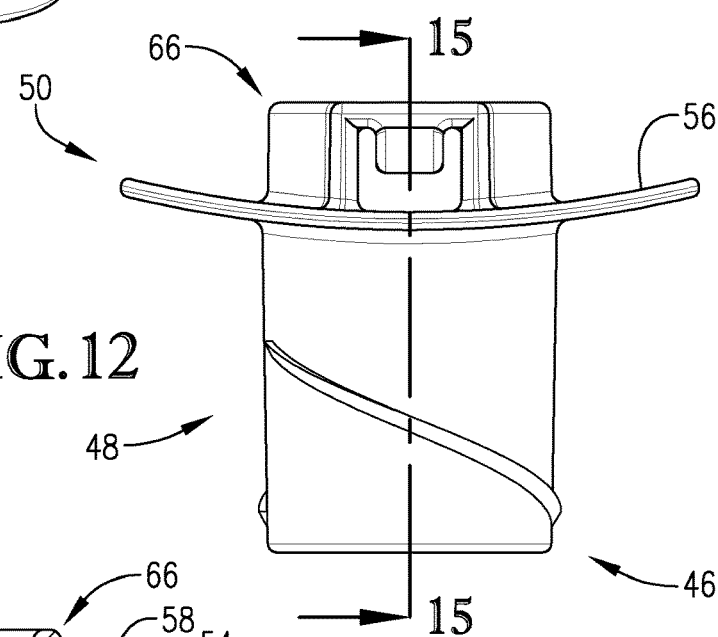
FIG. 12 is a front view of the conduit plug of FIG. 1.

Referring briefly to FIGS. 9-10, the motor case 12 also includes a face 44 surrounding opening 37. The face 44 has a radius of curvature corresponding or similar to that of the motor case 12 more generally.

The motor assembly 10 also includes a conduit plug 46 constructed in accordance with an embodiment of the present invention. The conduit plug 46 is configured for attachment to and sealing against the motor case 12. The conduit plug 46 enables electrical connection between components in the motor assembly 10 and exterior components. More particularly, the conduit plug 46 defines a central passage 47 that provides for passage of conducting cables (for example, motor leads) therethrough and permit joinder with an external tube to provide a sealed interface for the electrical connection.

Preferably, the conduit plug 46 comprises hard, elastic thermoplastic such as low-density polyethylene. It is foreseen, however, that a conduit plug may comprise any hard material that is sufficiently flexible to permit resilient, sealing engagement between a skirt and a face of a motor case, as well as resilient shifting (or swinging) of camming clips, in each case as described in more detail below, without departing from the spirit of the present invention. One of ordinary skill will also appreciate that a conduit plug may comprise one or more other materials—for instance, where a skirt rigidly engages an underlying face of a motor case and/or camming clips are constructed with alternative shiftable (e.g., hinge) joints—within the scope of the present invention.

Turning now to FIGS. 10-17, the conduit plug 46 includes a connector body 48. Connector body 48 includes a base 50 presenting an interface 52 that generally matingly corresponds with and overlies the opening 37 of the motor case 12. The base 50 includes a perimetrical skirt 54 extending radially outward relative to a longitudinal axis L (discussed in more detail below). The skirt 54 is of greater dimension than the opening 37, and includes an underside 56.

The face 44 of the motor case 12 and the underside 56 of skirt 54 preferably have complementary shapes (that is, substantially similar radiuses of curvature) to facilitate sealing engagement along the interface 52 therebetween. In the illustrated embodiment, the face 44 and skirt 54 have a modest curvature corresponding broadly to the cylindrical shape of the case 12. However, for some aspects of the present invention, a face and skirt can have different complementary shapes (for example, polygonal, curved and/or curvilinear), as long as a sealed interface between the two is achievable.

Figure 13:
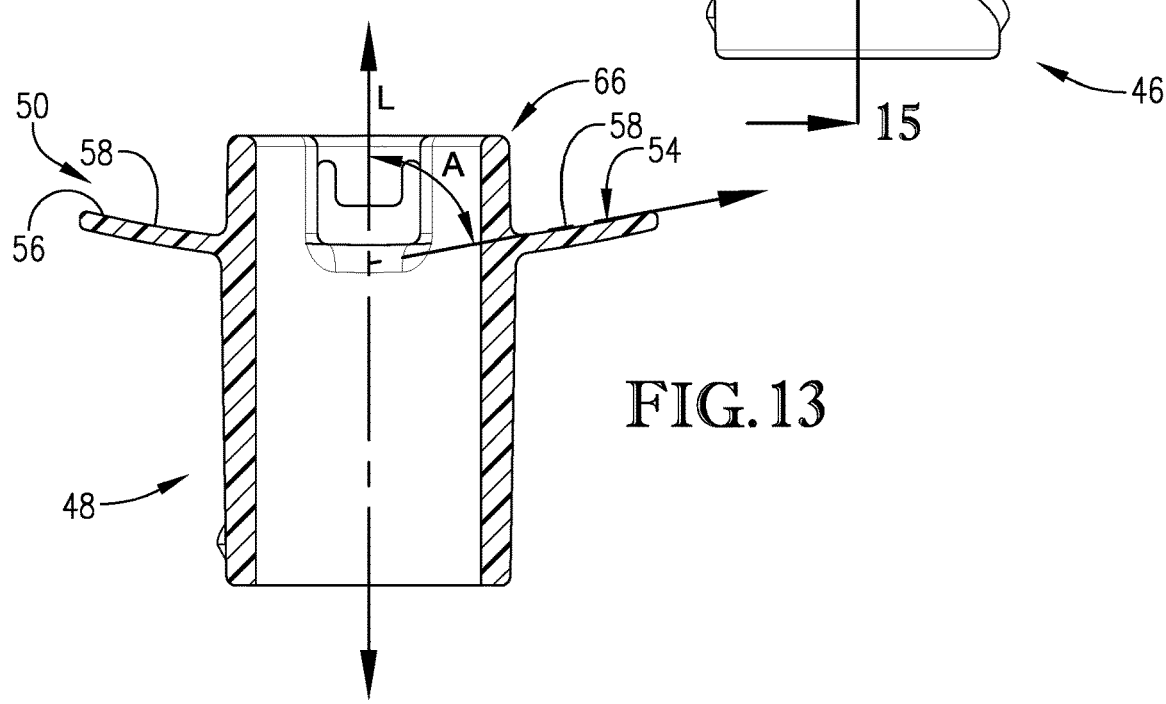
FIG. 13 is a cross-sectional front view of the conduit plug of FIG. 1, taken along line 13-13 of FIG. 10.

Preferred embodiments of the skirt 54 are further configured to facilitate generous manufacturing tolerances and an improved seal without the need for extensive installation tooling. More particularly, and turning to FIG. 13, a radial centerline of the generally cylindrical connector body 48 may extend along a longitudinal axis L. FIG. 13 illustrates a bisected view of the conduit plug 46, including radially central side portions 58 of the underside 56. The radially central side portions 58 may form an acute angle A with the axis L. Angle A may be between seventy and eighty-five degrees (70-85°), inclusive. Preferably, the angle A is eighty degrees (80°).

It should be noted here that a "radially central" section of a portion of the conduit plug 46, as used herein, is a section of that portion that is between radially inner and outer extremities of that portion, where the "radial" direction is along a radially-extending axis C (discussed in more detail below).

Moreover, and referring specifically to FIG. 19, the face 44 may include radially central side portions 60 corresponding to the radially central side portions 58 of the skirt 54. Radially central side portions 60 of the face 44 respectively form an angle B with respect to the axis L. The angle B is substantially the same as or marginally higher than the angle A formed by adjacent corresponding side portions 58 of the skirt 54, and is preferably between seventy and eighty-eight degrees (70-88°). More preferably, the angle B is eighty-one degrees (81°) along portions of the face 44 that are adjacent radially central side portions 58 of the skirt 54 that have an angle A of eighty degrees (80°). In preferred embodiments, the angles A and B of respective corresponding side portions 58, 60 are within five degrees (5°) of one another.

Configuring a plug and motor case so that a marginally larger angle B is maintained as compared with an angle A of adjacent surfaces helps ensure that a skirt of such a plug— where elastic and resilient—is slightly biased upon assembly to the motor case so as to press against the motor case and/or a sealing gasket positioned therebetween for better sealing.

One of ordinary skill will appreciate that angles formed with respect to a longitudinal axis of a plug may vary across side portions of a skirt without departing from the spirit of the present invention. Moreover, while it is preferred that central portions of an underside of a skirt conform to the angular relationships outlined herein, one of ordinary skill will also appreciate that, in other preferred embodiments, more or all of a side portion of an underside of a skirt may so conform, or only radially inner and/or outer extremities may so conform, within the scope of the present invention.

Figure 15:
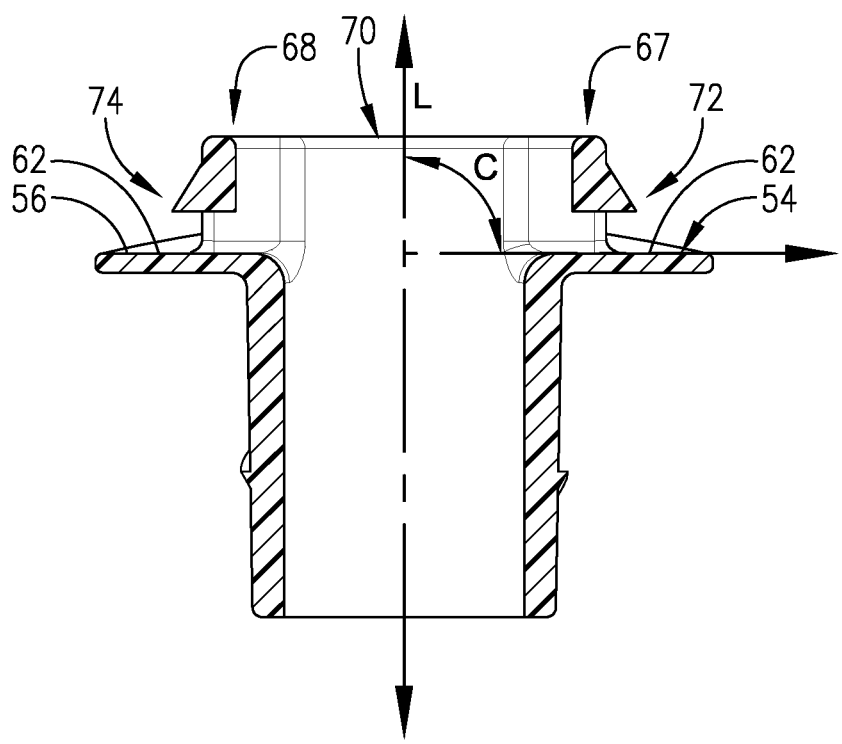
FIG. 15 is a cross-sectional side view of the conduit plug of FIG. 1, taken along line 15-15 of FIG. 12.

Referring briefly to FIG. 15, the underside 56 of the skirt 54 may also include radially central front and back surfaces 62. The front and back surfaces 62 form an angle C with the axis L that is approximately a right angle (ninety degrees (90°)) or marginally less than a right angle. Preferably, the angle C is between eighty-five and ninety degrees (85-90°), inclusive.

One of ordinary skill will appreciate that a face of a motor case configured to form a sealing interface with a skirt of a conduit plug may present an alternative topography—for instance, deviating from conformity with the broader cylindrical outer margin of a corresponding motor case—without departing from the spirit of the present invention. A skirt of a corresponding motor plug may be alternatively shaped to correspond to such a face, in accordance with the teachings disclosed above, within the scope of the present invention.

The preferred motor assembly 10 also includes a gasket 64 disposed between the underside 56 of the skirt 54 and the face 44. The gasket 64 is preferably, although not necessarily, made of a compressible and elastic material, such as rubber or other elastomeric materials known for use in constructing gaskets. The gasket 64 may be substantially planar, may have a radius of curvature similar to the underside 56 and/or the face 44, or may be otherwise configured within the scope of the present invention. The seal provided by the gasket 64 against the motor case 12 along the interface 52 prevents or restricts dust and/or moisture that may exist around the outside of the motor case 12 from seeping inside the motor case 12. The sealing out of dust and/or moisture reduces damage to the electrical elements of the motor assembly 10 in dirty, moist and/or wet operating conditions.

One of ordinary skill will appreciate that adhesive may be coated along an interface to enhance sealing. It is also foreseen that a connector body more generally may seal against a motor case directly and/or without the need for a gasket/adhesive without departing from the spirit of the present invention.

In an embodiment of the present technology, "sealing" or "substantial sealing" of a motor case, compartment, passage or space against ingress of liquids or particulates may be achieved with reference to a particular application. Substantial sealing may be determined by an ingress protection rating measured according to INTERNATIONAL ELECTROTECHNICAL COMMISSION® (IEC™) 60529, "Degrees of Protection Provided by Enclosures" (the "IP Rating"). For example, substantial sealing of a structure designed to be dust protected may correspond to an IP rating in a solids category of at least five (5). In another example, substantial sealing of a structure designed to be dust tight may correspond to an IP rating in the solids category of six (6). In yet another example, substantial sealing of a structure across solids and liquids categories meets an IP rating of fifty-four (54) or greater (in one or both categories). In each case, the exemplary IP Ratings are determined according to standards promulgated at the time of the earliest priority filing hereof.

One of ordinary skill will appreciate that a variety of methods and standards may be employed, and that the degree of sealing required for a particular application may vary, within the scope of the present technology.

The base 50 of the connector body 48 also includes a generally cylindrical tube 66 extending below the skirt 54 and having circumferentially-spaced, opposed straight-edged segments 67, 68. The illustrated segments 67, 68 are shaped as three-walled rectangles sized to respectively sit flush inside and engage with corresponding segments 41, 42 of the edge 38. Moreover, opposed arcuate segments 69, 70 of the generally cylindrical tube are shaped and sized to sit inside corresponding segments 39, 40 of the edge 38. Preferably, the engagement between segments 67, 68 of the base 50 and segments 39, 40 of the edge 38 substantially restricts rotation of the conduit plug 46 once assembled to the motor case 12.

One of ordinary skill will appreciate that embodiments including more or fewer rotation-arresting straight edges may be included within the scope of the present invention. Moreover, it is foreseen that a base and/or edge of a motor face case may include or comprise a variety of discontinuities or protuberances deviating from a perfectly round shape, with such discontinuities and/or protuberances having a rotation-arresting effect, without departing from the spirit of the present invention.

Figure 14:
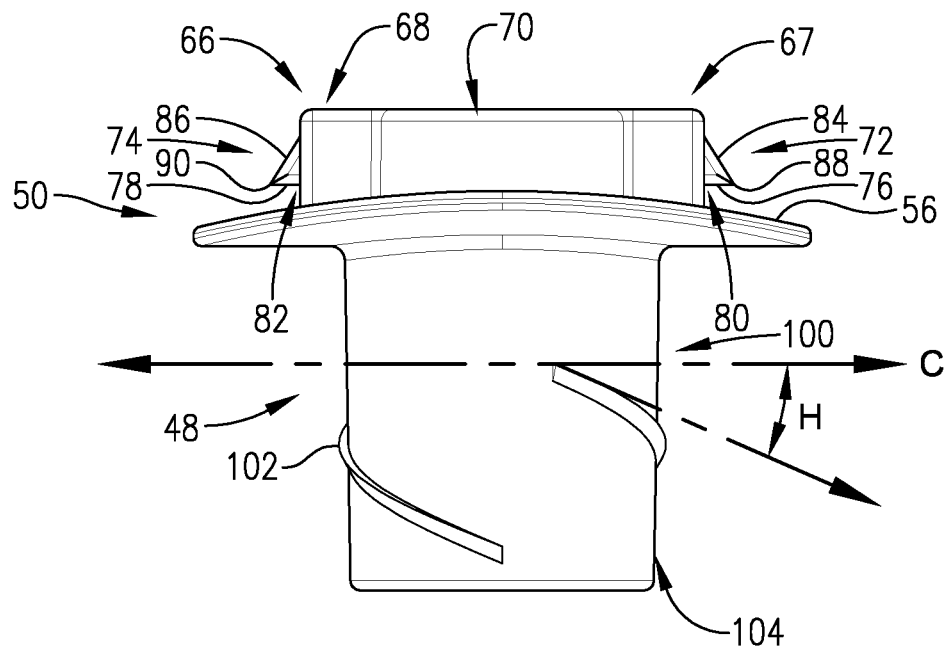
FIG. 14 is a side view of the conduit plug of FIG. 1.

Referring to FIG. 14, the base 50 of the connector body 48 also has generally opposed camming clips 72, 74 respectively extending radially outwardly from segments 67, 68. The clips 72, 74 respectively include back surfaces 76, 78 extending radially outwardly from the tube 66. The back surfaces 76, 78 respectively define, in cooperation with the underside 56 of the skirt 54, pockets 80, 82. Pockets 80, 82 are respectively sized to receive and partially enclose portions of the edge 38 comprising the segments 41, 42. That is, the back surfaces 76, 78 are sufficiently distant from the underside 56 of the skirt 54 to receive adjacent portions of the edge 38 therebetween. Moreover, the clips 72, 74 include incline faces 84, 86 respectively extending at an angle from back surfaces 76, 78 and away from the skirt 54. Outer edges 88, 90 respectively extend between incline faces 84, 86 and corresponding back surfaces 76, 78.

Figure 16:
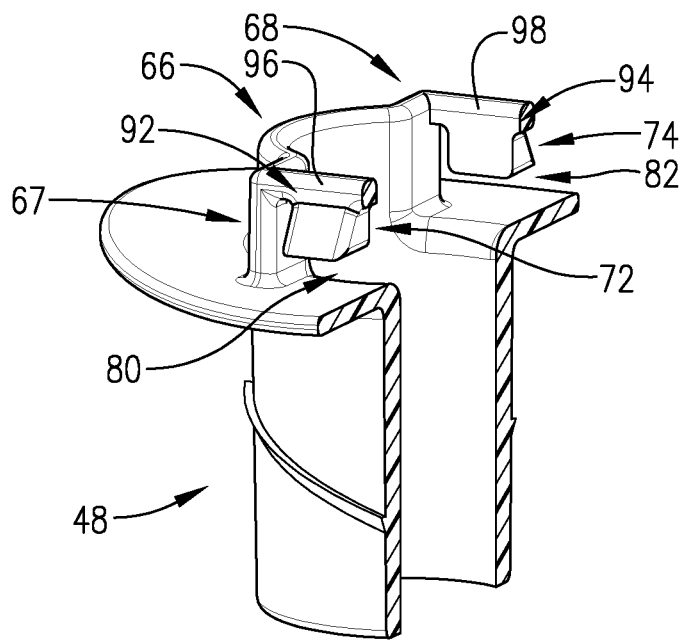
FIG. 16 is a perspective, vertical cross-section of the conduit plug of FIG. 1 cut along sides of camming clips of the conduit plug.
Figure 17:
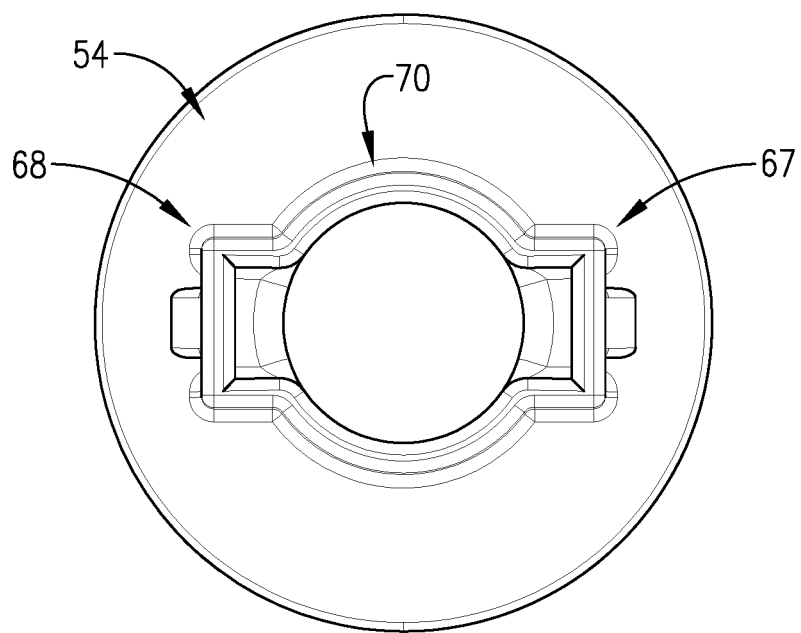
FIG. 17 is a bottom view of the conduit plug of FIG. 1.

Turning to FIG. 16, the segments 67, 68 respectively include outermost or middle walls 92, 94. The walls 92, 94 include the clips 72, 74 and corresponding pivot rails 96, 98. The pivot rails 96, 98 respectively extend between and interconnect the remaining walls of the three-walled rectangular segments 67, 68. The pivot rails 96, 98 may permit resilient rotation (swinging) of the clips 72, 74 during assembly of the conduit plug 46 to the motor case 12.

Assembly of the conduit plug 46 to the motor case 12 preferably includes aligning segments 67, 68 of the plug 46 respectively with segments 41, 42 of the edge 38, and inserting the tube 66 into the opening 37. Engagement of the faces 84, 86 respectively with the segments 41, 42 as the plug 46 is pressed downward against the edge 38 causes the clips 72, 74 to rotate about the pivot rails 96, 98. This causes retraction of the clips 72, 74 relative to the remainder of the base 50 until the edges 88, 90 respectively dip inside the segments 41, 42. The plug 46 is pressed further until the edges 88, 90 are inside the motor chamber 18 beyond the edge 38 and resiliently return to original positions, forming a snap-fit attachment to the motor case 12.

Upon attachment, portions of the edge 38 will be trapped in the pockets 80, 82 respectively between the back surfaces 76, 78 and the skirt 54, securing the plug 46 within the opening 37 against removal by casual and/or inadvertent pulling forces.

In addition, as the plug 46 is pressed downward into the opening 37, the gasket 64 is compressed along the interface 52 to provide a seal against ingress of liquids or particulates. More particularly, upon assembly, the gasket 64 is compressed by the skirt 54 against the face 44, and resiliently responds by pressing the skirt 54 outward until back surfaces 76, 78 engage with and against interior surfaces of the motor case 12 opposite the face 44, forming a secure snap-fit between the plug 46 and the motor case 12.

It is foreseen that clips may extend from anywhere along a perimeter of a base below a skirt of a conduit plug without departing from the spirit. One of ordinary skill will appreciate that other resilient members—such as retractable projections—may replace clips within the scope of the present invention. Also or alternatively, pivot rails may be replaced by rotatable joints of any variety of shiftable connections without departing from the spirit of the present invention. Still further, it is foreseen that back surfaces of clips may be inclined at angles mirroring opposite respective incline surfaces, enabling easier removal from a motor case in a pulling motion, without departing from the spirit of the present invention.

The combined engagement between segments 67, 68 and segments 41, 42, as well as between the clips 72, 74 and the edge 38, secures the conduit plug 46 against rotation and/or removal via casual and/or inadvertent pulling motions. Moreover, the engagement between the skirt 54, the gasket 64 and the face 44 secures the conduit plug against insertion too deeply into the opening 37 and provides for sealing of the case 12.

Further, as discussed above, the preferred configuration of the conduit plug 46 includes clips 72, 74 extending from segments 67, 68 and respectively engaging with substantially straight edges of the segments 41, 42. Engagement with such straight edges of segments 41, 42—as compared with, for example, engagement with rounded edges—may allow for the force(s) of such engagement to be distributed across the breadth of the clips 72, 74, reducing wear-and-tear associated with assembly and removal and providing for a more secure connection.

Turning to FIG. 14, the connector body 48 also includes a ribbed tube 100 extending away from the skirt 54 opposite the base 50. The ribbed tube 100 is preferably cylindrical. A helical rib 102 extends about a radially outer margin 104 of the tube 100. More particularly, the helical rib 102 extends along the outer margin 104 at a helix angle H with respect to a radially-extending axis C of the tube 100 (perpendicular to the axis L). In a preferred embodiment, the angle H is between forty-five and seventy-five degrees (45-75°), inclusive. More preferably, the angle H is sixty-seven degrees (67°). The helical rib 102 at helical angle H provides a structure for engagement with an unthreaded inner surface of another, external, tube (not shown), thereby resisting removal and substantially completing the seal restricting ingress of external contaminants into the chamber 18. However, it is foreseen that threaded and other varieties of external tubes may be fitted thereagainst without departing from the spirit of the present invention.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

Those of ordinary skill in the art will appreciate that any suitable combination of the previously described embodiments may be made without departing from the spirit of the present invention.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A conduit plug for attachment to a motor case, the conduit plug comprising:
a base partly defining a central passage extending along a longitudinal axis of the plug, the base including: (a) a skirt extending radially with respect to the longitudinal axis, and (b) two circumferentially-spaced straight-edge segments; and
a ribbed tube cooperatively defining the central passage and extending from the skirt opposite the two straight-edge segments,
each of the two straight-edge segments including a camming clip configured for resilient retraction toward the central passage.

2. The conduit plug of claim 1, the base including two generally opposing arcuate segments, each of the arcuate segments being interposed between the two straight-edge segments.

3. The conduit plug of claim 2,
each of the two straight-edge segments comprising a three-walled rectangle including a middle wall,
the camming clips respectively at least partly comprising the middle walls.

4. The conduit plug of claim 3,
each of the middle walls further comprising a pivot rail that enables the resilient retraction.

5. The conduit plug of claim 1,
the skirt including an underside that has opposite side segments, each having at least a portion forming an angle with the longitudinal axis of between seventy and eight-five degrees (70-85°), inclusive.

6. The conduit plug of claim 5,
the ribbed tube defining an outer margin and including a helical rib extending along the outer margin,
the ribbed tube defining a radially-extending axis relative to the longitudinal axis,
the helical rib having a helix angle with respect to the radially-extending axis of between forty-five and seventy-five degrees (45-75°), inclusive.

7. A motor assembly comprising:
a motor case including a face and an edge adjacent the face defining an opening; and
a conduit plug inserted into the opening and including—
a base extending along a longitudinal axis and including a camming clip and a skirt overlying the face, the skirt extending radially relative to the longitudinal axis; and
a ribbed tube extending from the skirt opposite the camming clip,
the face including a face side portion,
the skirt including an underside that has a side portion positioned correspondingly to the face side portion,
the skirt side portion forming an acute angle with the longitudinal axis,
the face side portion forming an acute angle with the longitudinal axis within five degrees (5°) of the angle formed by the skirt side portion.

8. The motor assembly of claim 7, the angle formed by the skirt side portion being between seventy and eight-five degrees (70-85°), inclusive.

9. The motor assembly of claim 8, the angle formed by the skirt side portion being eighty degrees (80°) and the angle formed by the face side portion being eighty-one degrees (81°).

10. The motor assembly of claim 8, further comprising a gasket compressed between the skirt and the face.

11. The motor assembly of claim 10,
the base including a straight-edge segment comprising the camming clip,
the edge including a straight-edge segment, the straight-edge segment of the edge engaging with the straight-edge segment of the base to restrict rotation of the conduit plug.

12. The motor assembly of claim 11, the camming clip including a back surface engaged with an interior surface of the motor case opposite the face to maintain compression of the gasket against the face.

13. The conduit plug of claim 7,
the ribbed tube defining an outer margin and including a helical rib that extends along the outer margin,
the ribbed tube defining a radially-extending axis relative to the longitudinal axis,
the helical rib having a helix angle with respect to the radially-extending axis of between forty-five and seventy-five degrees (45-75°), inclusive.

14. A motor assembly comprising:
a motor case including a face and an edge defining an opening adjacent the face, the edge including two circumferentially-spaced straight edge portions; and
a conduit plug comprising—
a base partly defining a central passage extending along a longitudinal axis and including: (a) a skirt extending radially with respect to the longitudinal axis, and (b) two straight-edge segments generally corresponding to the straight-edge portions of the edge; and
a ribbed tube cooperatively defining the central passage and extending from the skirt opposite the two straight-edge segments,
each of the two straight-edge segments including a camming clip configured for engagement with one of the two straight edge portions of the motor case and for resilient retraction toward the central passage.

15. The conduit plug of claim 14, the base including two arcuate segments generally opposed across the central passage and interposed between the two straight-edge segments.

16. The conduit plug of claim 15,
each of the two straight-edge segments comprising a three-walled rectangle including a middle wall,
the camming clips respectively at least partly comprising the middle walls.

17. The conduit plug of claim 16,
each of the middle walls further comprising a pivot rail that enables the resilient retraction.

18. The conduit plug of claim 14,
the central passage extending along a longitudinal axis of the plug,
the skirt including an underside that has opposite side segments, each having at least a portion forming an angle with the longitudinal axis of between seventy and eight-five degrees (70-85°), inclusive.

19. The conduit plug of claim 18,
the angle being eighty degrees (80°).

20. The conduit plug of claim 19, further comprising a gasket compressed between the skirt and the face.

\* \* \* \* \*